US008242425B2

(12) United States Patent
Matsumoto et al.

(10) Patent No.: US 8,242,425 B2
(45) Date of Patent: Aug. 14, 2012

(54) PROJECTOR HAVING FIRST AND SECOND LAMPS WITH AN ILLUMINATION CONTROL DEVICE FOR TURNING ON LAMP HAVING HIGHER CONTRAST WITH RESPECT TO A LIGHT MODULATION DEVICE AND METHOD OF CONTROLLING LIGHTING THEREOF

(75) Inventors: Yuichiro Matsumoto, Matsumoto (JP); Osamu Fujimaki, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 429 days.

(21) Appl. No.: 12/700,505

(22) Filed: Feb. 4, 2010

(65) Prior Publication Data
US 2010/0208212 A1 Aug. 19, 2010

(30) Foreign Application Priority Data
Feb. 16, 2009 (JP) .................... 2009-032363

(51) Int. Cl.
*G01J 1/32* (2006.01)
(52) U.S. Cl. ......................... 250/205; 352/85
(58) Field of Classification Search .............. 250/205, 250/208.1, 216; 353/85, 94, 99, 119; 362/227–236, 362/241–253; 345/77, 63
See application file for complete search history.

(56) References Cited

U.S. PATENT DOCUMENTS
| | | | |
|---|---|---|---|
| 5,649,753 A | 7/1997 | Masumoto | |
| 6,183,093 B1 | 2/2001 | Sawai | |
| 7,090,357 B2 * | 8/2006 | Magarill et al. | 353/94 |

FOREIGN PATENT DOCUMENTS
| | | |
|---|---|---|
| JP | A-8-36180 | 2/1996 |
| JP | A-11-149061 | 6/1999 |

* cited by examiner

*Primary Examiner* — Que T Le
(74) *Attorney, Agent, or Firm* — Oliff & Berridge, PLC (57) ABSTRACT

A projector includes: first and second lamps; a combining member configured to combine the light from the first and second lamps; a light modulation device arranged on the downstream side of an optical path of the combining member configured to provide higher modulation contrast with respect to the light emitted from the first lamp and entering in a state of being inclined in a first direction with respect to a system optical axis than modulation contrast with respect to the light emitted from the second lamp and entering in a state of being inclined in a second direction; and an illumination control device configured to turn ON the first lamp having the higher contrast with respect to the light modulation device on a priority basis for illumination of the light modulation device in a one-lamp mode in which only one of the first and second lamps is turned ON.

10 Claims, 7 Drawing Sheets

PROJECTOR HAVING FIRST AND SECOND LAMPS WITH AN ILLUMINATION CONTROL DEVICE FOR TURNING ON LAMP HAVING HIGHER CONTRAST WITH RESPECT TO A LIGHT MODULATION DEVICE AND METHOD OF CONTROLLING LIGHTING THEREOF

BACKGROUND

1. Technical Field

The present invention relates to a projector which is capable of illuminating using two lamps in combination and also illuminating independently by either one of the two lamps, and a method of controlling lighting of light sources (lamps or the like).

2. Related Art

In the related art, a projector which is capable of performing bright image projection by using a plurality of lamps and is configured to cause a lamp having a shorter cumulative lighting time to turn ON on a priority basis from among the plurality of lamps is known (see JP-A-8-36180). A projector which is configured to use one of two lamps, and switch to another lamp when a lighting time of the one of the two lamps is counted and a predetermined time is elapsed is also known (see JP-A-11-149061).

JP-A-8-36180 and JP-A-11-149061 are examples of related art.

In a projector of a liquid crystal type, a liquid crystal panel as a light modulation device has an incident angle dependency which is a characteristic such that contrast of an image to be projected on a screen is lowered depending on the angle of an incident light. Therefore, in a case where only one of two lamps is turned ON in a projector which is capable of illuminating the liquid crystal panel by the two lamps, if the lamp to be illuminated is selected on the basis of the cumulative lighting time, for example, contrast characteristics may be deteriorated relatively according to the angle dependency of the liquid crystal panel and, in this case, the quality of the projected image is deteriorated.

SUMMARY

An advantage of some aspects of the invention is to provide a projector being capable of illuminating using two lamps in combination and also illuminating independently by one of the two lamps, and is capable of projecting a high quality image having high contrast even when image projection is performed by illuminating only one of the two lamps, and a method of controlling lighting of the same.

According to an aspect of the invention, there is provided a projector including: first and second lamps arranged at different positions from each other and each configured to emit a light source light; a combining member configured to combine the lights from the first and second lamps in a state of being inclined with respect to each other; a light modulation device arranged on the downstream side of an optical path of the combining member, configured to be able to be illuminated by the light from at least one of the first and second lamps, and configured to provide higher modulation contrast with respect to the light emitted from the first lamp and entering in a state of being inclined in a first direction than modulation contrast with respect to the light emitted from the second lamp and entering in a state of being inclined in a second direction which is different from the first direction with respect to the system optical axis; and an illumination control device configured to turn ON the first lamp having the higher contrast with respect to the light modulation device on a priority basis for illumination of the light modulation device in a one-lamp mode in which only one of the first and second lamps is turned ON.

In the projector, in the one-lamp mode in which only one of the first and second lamps is turned ON, the first lamp which causes the light to enter the light modulation device from the direction which provides the higher contrast thereto is turned ON on a priority basis for the illumination of the light modulation device. Accordingly, desirable contrast is obtained even when the image projection is performed only by one of the two lamps, and projection of a high-quality image is achieved.

Preferably, the projector includes: a color separation light-guide system configured to separate an illumination light outgoing from the combining member into colors on the basis of predetermined wavelengths and guide to optical paths in the respective colors; and a light modulation unit having light modulation devices for respective colors on the optical paths of the respective colors and modulating the respective colored lights guided to the optical paths for the respective colors by the light modulation devices for respective colors, in which at least one of the light modulation devices for respective colors is the light modulation device. In this configuration, projection of the color image having desirable contrast characteristics is achieved in the one-lamp mode.

Preferably, contrast corresponding to a light-incident direction from the first lamp is higher than contrast corresponding to a light-incident direction from the second lamp in each of the light modulation devices for respective colors. In this configuration, the images are formed at high contrast in the modulations of any colored lights.

Preferably, the light modulation devices for respective colors are three light modulation devices which modulate a red light, a green light, and a blue light respectively, and contrast corresponding to a light-incident direction from the first lamp is higher than contrast corresponding to a light-incident direction from the second lamp at least in the light modulation device configured to modulate the green light. In this configuration, images are formed at high contrast in at least the modulation of the green light which affects most the contrast in the one-lamp mode.

Preferably, the light modulation device includes a liquid crystal panel configured to modulate an incident light, and a pair of polarization filters arranged on an incident side and an outgoing side of the liquid crystal panel and configured to allow passage of a predetermined polarized light therethrough.

Preferably, the liquid crystal panel includes a liquid crystal layer of a twisted nematic (TN) type, and an angle formed between a light-incident direction from the first lamp with respect to the liquid crystal panel and a direction of alignment of a residual tilt in the liquid crystal layer in a black display state in the liquid crystal panel is smaller than an angle formed between a light-incident direction from the second lamp with respect to the liquid crystal panel and the direction of alignment of the residual tilt. The term "black display state" in the liquid crystal of the twisted nematic type means a light-shielding state obtained by bringing the liquid crystal layer interposed between cross Nicols into a state of being applied with a voltage. The term "residual tilt" means a state in which liquid crystalline compounds which constitute the liquid crystal layer are not oriented completely vertical to a substrate of the liquid crystal panel and a tilt (inclination) is remained even though the voltage is applied thereto. The direction of alignment of the residual tilt means a direction obtained by averaging the tilt amount of the respective liquid crystalline compounds. In this case, formation of brighter images is achieved by using the liquid crystal of the twisted nematic type and, in addition, in the one-lamp mode as well, the light-incident direction from the first lamp to be turned ON is relatively close to the direction of alignment of the residual tilt in the liquid crystal panel, so that projection of images in which the desired contrast is maintained is enabled.

Preferably, the liquid crystal panel includes a liquid crystal layer of a vertical alignment type, and an angle formed between a light-incident direction from the first lamp with respect to the liquid crystal panel and a direction of alignment of a pre-tilt in the liquid crystal layer in a black display state in the liquid crystal panel is smaller than an angle formed between a light-incident direction from the second lamp with respect to the liquid crystal panel and a direction of alignment of the pre-tilt. The term "black display state" in the liquid crystal of the vertical alignment type means a light-shielding state obtained by bringing the liquid crystal layer interposed between cross Nicols into a state of not being applied with a voltage. The term "pre-tilt" means a state in which the liquid crystalline compounds which constitute the liquid crystal layer are not oriented accurately vertical to the substrate of the liquid crystal panel and are tilt (inclined) in a state in which the voltage is not applied thereto. In this case, projection of images at relatively high contrasts is achieved by using the liquid crystal of the vertical alignment type and, in addition, in the one-lamp mode as well, the light-incident direction from the first lamp to be turned ON is relatively close to the direction of alignment of the pre-tilt in the liquid crystal panel, so that projection of images in which the desired contrast is maintained is enabled.

According to a second aspect of the invention, there is provided a method of controlling lighting of a projector, the projector having: first and second light sources arranged at different positions from each other and each configured to emit a light source light; a combining member configured to combine the lights from the first and second light sources in a state of being inclined with respect to each other; a light modulation device arranged on the downstream side of an optical path of the combining member, configured to be able to be illuminated by the light from at least one of the first and second light sources, and configured to provide modulation contrast with respect to the light emitted from the first light source and entering in a state of being inclined in a first direction with respect to the system optical axis and modulation contrast with respect to the light emitted from the second light source and entering in a state of being inclined in a second direction which is different from the first direction with respect to the system optical axis, these modulation contrasts being different from each other; including: determining whether a lighting mode is a one-lamp lighting mode in which only one of the first and second light sources is turned ON or not, in which when it is determined to be the one-lamp lighting mode by the determining, the light source which causes the light to enter the light modulation device in a direction which provides higher contrast is turned ON.

In the method of controlling lighting of the projector, in the one-lamp lighting mode in which only one of the first and second light sources is turned ON, the first light source which causes the light to enter the light modulation device from the direction which provides the higher contrast thereto is turned ON on a priority basis for illumination of the light modulation device. Accordingly, desirable contrast is obtained even when the image projection is performed only by one of the two light sources, and projection of a high-quality image is achieved.

According to a third aspect of the invention, there is provided a method of controlling lighting of a projector, the projector having: first and second light sources arranged at different positions from each other and each configured to emit a light source light; a combining member configured to combine the lights from the first and second light sources in a state of being inclined with respect to each other; a light modulation device arranged on the downstream side of an optical path of the combining member, configured to be able to be illuminated by the light from at least one of the first and second light sources, and configured to provide modulation contrast with respect to the light emitted from the first light source and entering in a state of being inclined in a first direction with respect to the system optical axis and modulation contrast with respect to the light emitted from the second light source and entering in a state of being inclined in the second direction which is different from the first direction with respect to the system optical axis, these modulation contrasts being different from each other; including: determining whether a lighting mode is a one-lamp lighting mode in which only one of the first and second light sources is turned ON or not, and further determining whether the mode is a mode giving a priority to the contrast or not when it is determined to be the one-lamp lighting mode by the determining, in which when it is determined that the mode is the mode giving a priority on the contrast by the further determining, the light source which causes the light to enter the light modulation device in the direction which provides higher contrast is turned ON.

In the method of controlling lighting of the projector, in the one-lamp lighting mode, in which only one of the first and second light sources is turned ON, whether or not the first light source which causes the light to enter the light modulation device from the direction which provides the higher contrast thereto is turned ON on a priority basis for illumination of the light modulation device may be selected.

Preferably, when it is determined to be a mode which does not give a priority to the contrast by the further determining, the light source having a shorter cumulative lighting time from between the first and second light sources is turned ON. In this case, elongation of the lifetime of the light source is achieved.

BRIEF DESCRIPTION OF THE DRAWINGS

The invention will be described with reference to the accompanying drawings wherein like numbers reference like elements.

FIG. 2 is an enlarged cross-sectional view explaining a structure of a liquid crystal light valve and the like.

FIG. 43 is a flowchart showing the example of the illumination control of the projector.

DESCRIPTION OF EXEMPLARY EMBODIMENTS

First Embodiment

Figure 1:
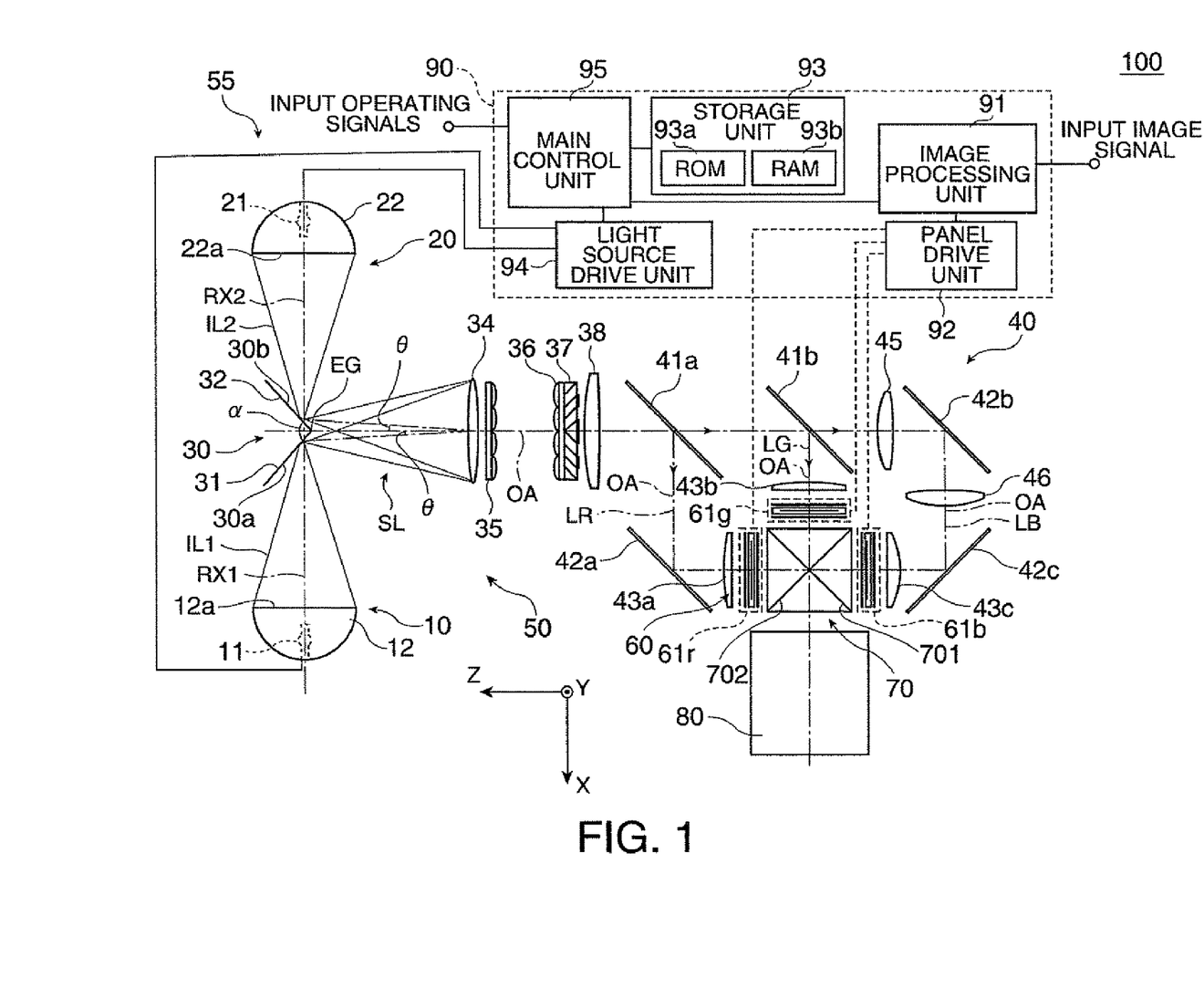
FIG. 1 is a plan view conceptually showing a projector according to a first embodiment.

Referring now to FIG. 1 and other drawings, a projector according to a first embodiment will be described.

1. Rough Description of Projector

As shown in FIG. 1, a projector 100 includes a body optical system 55 configured to perform image projection by forming an image light from an illumination light, and a control device 90 configured to control a system as a whole. The body optical system 55 includes an illumination device 50, a color separation light-guide system 40, a light modulation unit 60, a cross dichroic prism 70, and a projection system 80.

2. Body Optical System of Projector

The illumination device 50 in the body optical system 55 of the projector 100 includes first and second light source lamp units 10 and 20, a combining mirror 30, a parallelizing system 34, first and second lens arrays and 36, a polarization conversion element 37, and a superimposing lens 38, and is configured to form the illumination light.

The first light source lamp unit 10 and the second light source lamp unit 20 of the illumination device 50 are optical systems having the same structures, and are arranged in symmetry with respect to a system optical axis OA of the entire illumination device 50. The first and second light source lamp units 10 and 20 include first and second arc tubes 11 and 21 as light-emitting sources configured to generate light source lights each including a visual light wavelength range and first and second reflectors 12 and 22 as reflecting members configured to reflect the light source lights emitted from the first and second arc tubes 11 and 21, respectively, and function as first and second lamps, respectively. The first and second arc tubes 11 and 21 each are, for example, a high-pressure discharge lamp such as a high-pressure mercury lamp, which generates the light source light of a substantially white color having a sufficient amount of light to form the image light when being used in the projector 100 shown in FIG. 1. The first and second reflectors 12 and 22 are of a rotating oval surface type, and reflect the light source lights generated by the respective arc tubes 11, 21 from inner surfaces thereof. More specifically, the inner surfaces of the first and second reflectors 12 and 22 are formed into rotating oval surfaces formed by rotating ovals about optical axes RX1 and RX2 which are axes passing through first and second focal points, respectively, and function as depressed reflecting surfaces. Accordingly, the first and second reflectors 12 and 22 reflect the light source lights generated from the first and second arc tubes 11 and 21, and cause the same to go out from outgoing surfaces 12a and 22a as illumination lights IL1 and IL2 toward the combining mirror 30 so as to be condensed thereon, respectively.

The combining mirror 30 of the illumination device 50 is a combining member made up of a pair of first and second mirror panels 31 and 32. The first and second mirror panels 31 and 32 both have the same structures having a rectangular outlines, and are arranged so as to oppose the first and second light source lamp units 10 and 20 obliquely in symmetry with respect to the system optical axis OA. The first mirror panel 31 has a first reflecting surface 30a corresponding to the illumination light IL1 from the first light source lamp unit 10 on the front side thereof, and the second mirror panel 32 has a second reflecting surface 30b corresponding to the illumination light IL2 from the second light source lamp unit 20 on the front side thereof. The first and second reflecting surfaces 30a and 30b both are vertical to an XZ plane. The combining mirror 30 is formed with an edge EG, which is a distal end portion of the combining mirror 30, by abutting an end portion of the first mirror panel 31 and an end portion of the second mirror panel 32. The edge EG is arranged so as to be orthogonal to the system optical axis OA. The first and second reflecting surfaces 30a and 30b are arranged in the vicinity of the second focal points (not shown) of the first and second reflectors 12 and 22 corresponding thereto, respectively. The first and second reflecting surfaces 30a and 30b reflect the illumination lights IL1 and IL2 emitted respectively from the first and second light source lamp units 10 and 20 and minimized in diameter in the substantially same direction. More specifically, an angle α formed between the first mirror panel 31 and the second mirror panel 32 is in the order of 92°, for example. Accordingly, the illumination lights IL1 and IL2 emitted respectively from the first and second light source lamp units 10 and 20 are reflected from the respective first and second reflecting surfaces 30a and 30b slightly obliquely with respect to the system optical axis OA. In other words, the optical axes RX1 and RX2 of the illumination lights IL1 and IL2 intersect at an intersecting point FX positioned on the system optical axis OA and on a front side of the first lens array 35 both in a state of inclined by a minute angle θ (about 2°) with respect to the system optical axis OA. In this manner, the illumination lights IL1 and IL2 coming from opposed directions are reflected by the combining mirror 30 to the substantially same direction (−Z direction) and combined although a small angle 2θ (about 4°) is formed therebetween, so that an illumination light SL is formed.

The first and second reflecting surfaces 30a and 30b of the combining mirror 30 are positioned in the vicinity of the second focal points of the first and second reflectors 12 and 22. However, the illumination lights IL1 and 1L2 on the first and second reflecting surfaces 30a and 30b each are not concentrated into a point, and are in a state assuming a illumination intensity distribution having a highest illumination intensity near the center thereof and dispersing concentrically therefrom.

The parallelizing system 34 is a light-converging lens configured to combine the reflected lights and parallelizes the illumination light SL combined into a single luminous flux by the reflection from the combining mirror 30. The illumination light SL going out from the parallelizing system 34 enters the first and second lens arrays 35 and 36 as a uniformizing system in a substantially parallelized state. The first and second lens arrays 35 and 36 each include a plurality of element lenses arranged in a matrix pattern. The element lenses which constitute the first lens array 35 split the luminous flux outgoing from the parallelizing system 34 into a plurality of partial luminous fluxes. The element senses which constitute the second lens array 36 cause the respective partial luminous fluxes to go out from the first lens array 35 at an adequate diverging angle. The polarization conversion element 37 is made up of a PBS prism array or the like, and is configured to convert the light source light outgoing from the second lens array only into a linear polarized light in a specific direction and supply the same to an optical system in downstream. The superimposing lens 38 converges the illumination light SL passing through the polarization conversion element 37 adequately as a whole to enable a superimposed illumination on liquid crystal light valves 61r, 61g, and 61b as light modulation devices for respective colors provided in the light modulation unit 60.

As described thus far, the illumination light SL may be formed also by combining the illumination lights IL1 and IL2, and may be formed only by one of the illumination light IL1 and the illumination light IL2. In other words, even when only the first light source lamp unit 10, for example, out of the first and second light source lamp units 10 and 20 is turned ON to emit only the illumination light IL1, the illumination light SL parallelized and uniformized to some extent may be formed by the optical system from the parallelizing system 34 to the superimposing lens 38. However, when turning only one lamp ON as described above, in both cases of using the first light source lamp unit 10 or using the second light source lamp unit 20, the direction of a center luminous flux of the illumination light SL formed of the illumination light IL1 or the illumination light IL2 is angled with respect to the system optical axis OA, although slightly. Therefore, the luminous flux from the first light source lamp unit 10 and the luminous flux from the second light source lamp unit 20 enter the liquid crystal light valves 61r, 61g, and 61b for the respective colors, which are irradiated objects, in an deviated state inclined in different directions with respect to the system optical axis OA. In this case, power consumption may be reduced by reducing the number of lamps to be illuminated.

The color separation light-guide system 40 includes first and second dichroic mirrors 41a and 41b, reflection mirrors 42a, 42b, and 42c, and three field lenses 43a, 43b, and 43c, and is configured to separate the illumination light emitted from the second light source lamp unit 20 into three colors of red (R), green (G), and blue (B) and guide respective color lights to the liquid crystal light valves 61r, 61g, and 61b in downstream. More specifically, the first dichroic mirror 41a reflects an illumination light LR in R-color and transmits illumination lights LG in G-color and LB in B-color out of three colors of R, G, and B. The second dichroic mirror 41b reflects the illumination light LG in G-color and transmits the illumination light LB in B-color out of the two colors of G and B. In the color separation light-guide system 40, the illumination light LR reflected from the first dichroic mirror 41a enters the field lens 43a for adjusting an incident angle via the reflection mirror 42a. The illumination light LG transmitted through the first dichroic mirror 41a and reflected from the second dichroic mirror 41b enters the field lens 43b for adjusting the incident angle. Further, the illumination light LB passed through the second dichroic mirror 41b enters the field lens 43c for adjusting the incident angle via relay lenses 44a and 44b and the reflection mirrors 42b and 42c.

The light modulation unit 60 includes the three liquid crystal light valves 61r, 61g, and 61b to which the three illumination lights LR, LG, and LB enter respectively. As described later in detail, the liquid crystal light valves 61r, 61g, and 61b each include a liquid crystal panel to be arranged at the center, and a pair of incident-light polarization filters and an outgoing-light polarization filter arranged so as to interpose the same therebetween. The lights in three colors LB, LG, and LR entering the liquid crystal light valves 61r, 61g, and 61b respectively are adjusted in intensity on the pixel-by-pixel base according to driving signals or control signals supplied to the respective liquid crystal light valves 61r, 61g, and 61b as electric signals.

The cross dichroic prism 70 is a light combining system configured to combine color images, and includes a first dichroic film 701 for reflecting the R-light and a second dichroic film 702 for reflecting the B-light arranged in X-shape in plan view arranged in the interior thereof. The cross dichroic prism 70 reflects the red light LR from the liquid crystal light valve 61r by the first dichroic film 701 to cause the same to go out on the right side of the direction of travel, cause the green light LG from the liquid crystal light valve 61g to proceed straight ahead and go out via the both dichroic films 701 and 702, and reflect the blue light LB from the liquid crystal light valve 61b by the second dichroic film 702 to cause the same to go out on the left side of the direction of travel.

The relation of optical arrangement of the three liquid crystal light valves 61r, 61g, and 61b of the light modulation unit 60 and the cross dichroic prism 70 will now be described. As described later in detail, the liquid crystal light valves 61r, 61g, and 61b each have an incident angle dependency which is a characteristic such that contrast of an image to be projected on a screen is lowered depending on the magnitude or the azimuth of the incident angle of the illumination light. Therefore, since the illumination light is deviated when the image is projected by turning only one of the first and second light source lamp units 10 and 20 ON, deference in contrast may be generated among the liquid crystal light valves 61r, 61g, and 61b depending on which lamp is used. In contrast, in the cross dichroic prism 70, the green light LG modulated by the liquid crystal light valve 61g goes out without being reflected, while the red light LR modulated by the liquid crystal light valve 61r and the blue light LB modulated by the liquid crystal light valve 61b go out after having reflected by the both first and second dichroic films 701 and 702 respectively. Therefore, in order to accommodate such the circumstance, the incident angle dependency of the liquid crystal light valve 61g and the incident angle dependencies of the liquid crystal light valves 61r and 61b may be designed so as to be laterally inverted. In this case, if the deviation of the illumination light is present, it is desirable to invert also the direction of deviation of the illumination light, that is, the principal incident directions, corresponding to the liquid crystal light valves 61r, 61g, and 61b in the respective colors in principle. However, there are cases when the deviation of the illumination light cannot be inverted because of the limitation in optical design due to the cost or other causes, and hence causing the illumination light to enter all the liquid crystal light valves 61r, 61g, and 61b from suitable directions is not necessarily possible. Therefore, in this case, the liquid crystal light valve 61g which has a large amount of light and affects most the contrast of modulation is considered as a reference from among the liquid crystal light valves 61r, 61g, and 61b in the respective colors. Then, at least as regards the liquid crystal light valve 61g, it is assumed to be a type in which the contrast of an image formed by a light from the first light source lamp unit 10 turned ON in a contrast-priority mode, described later, is higher than that of an image formed by a light from the second light source lamp unit 20 which is turned OFF in the contrast-priority mode.

The projection system 80 projects an image light combined by the cross dichroic prism 70 as a projection lens on the screen (not shown) as a color image.

3. Structure of Liquid Crystal Light Valve

Figure 2:
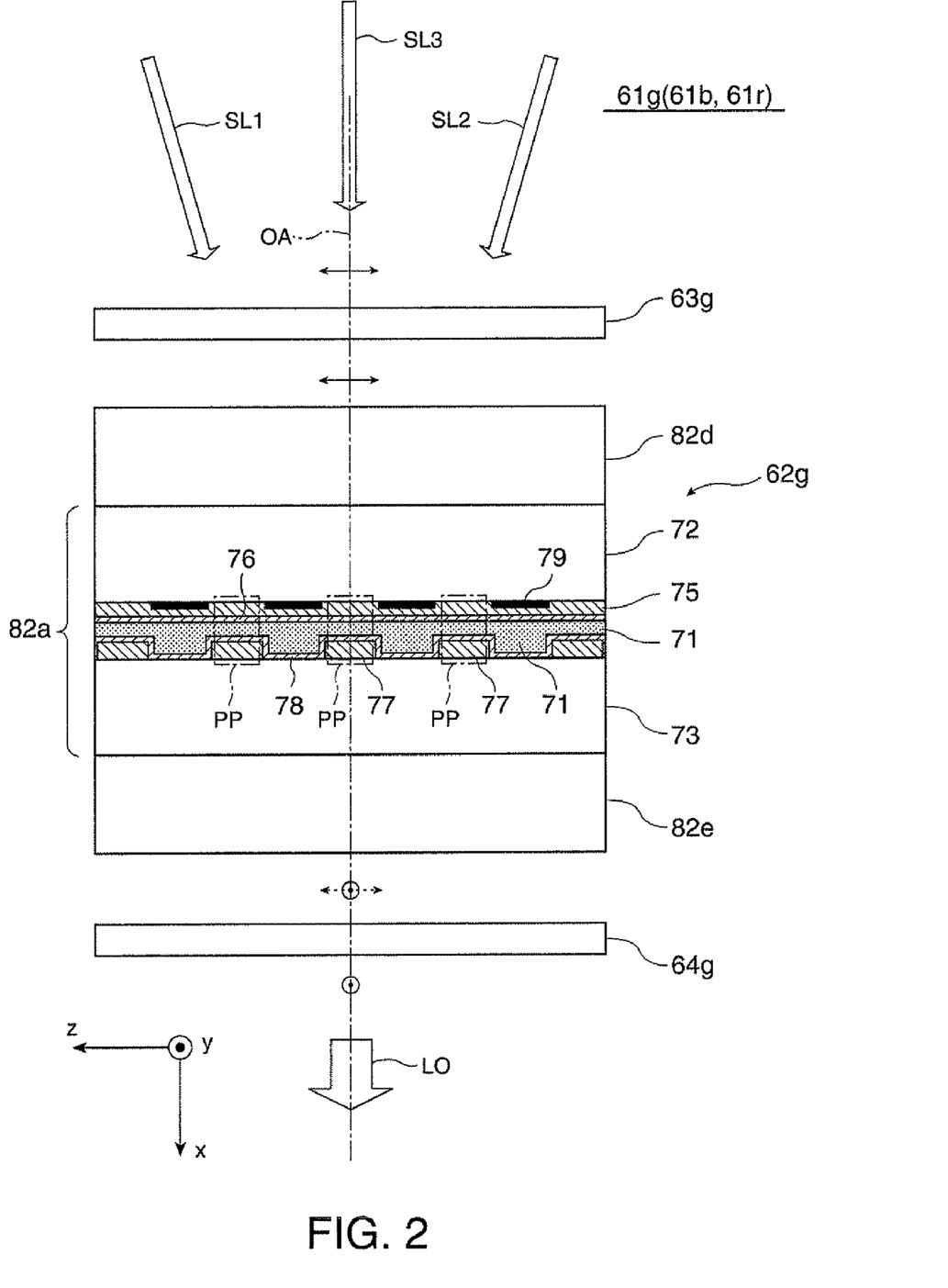

Referring now to FIG. 2 and other drawings, structures and features of the liquid crystal light valves 61r, 61g, and 61b will be described in detail. Since the structures of the three liquid crystal light valves 61r, 61g, and 61b are the same, the liquid crystal light valve 61g corresponding to the green light which is most affected by the contrast will be described as an example here. As shown in FIG. 2, the liquid crystal light valve 61g includes a liquid crystal panel 62g as a positive element for light modulation, an incident-light polarization filter 63g arranged on the incident side of the liquid crystal panel 62g, and an outgoing-light polarization filter 64g arranged on the outgoing side of the liquid crystal panel 62g. The liquid crystal light valve 61g is a non-light-emitting and transmissive light-modulation device configured to modulate a spatial distribution of intensity of incident lights SL1 and SL2 as the illumination lights and output an outgoing light LO as the modulated light. The incident lights SL1 and SL2 here indicate principal directions of the luminous fluxes of the lights from the first and second light source lamp units 10 and 20, respectively. Specifically, when viewed along an optical path shown in FIG. 1, for example, the direction of travel of the illumination light IL1 emitted from the first light source lamp unit 10 for example is inclined slightly to the left of the paper plane with respect to the system optical axis OA on the downstream side of the optical path after the first reflecting surface 30a. Therefore, the illumination light (green light) originated from the illumination light IL1 from components entering the liquid crystal light valve 61g enters the liquid crystal light valve 61g in the direction inclined slightly to the left on the paper plane with respect to the system optical axis OA on the downstream side of the optical path, that is, in the direction of the incident light SL1 shown in FIG. 2, as the principal direction of the luminous flux via the superimposing lens 38 and the second dichroic mirror 41b. In contrast, the direction of travel of the illumination light IL2 emitted from the second light source lamp unit 20 shown in FIG. 1 is inclined slightly to the right of the paper plane with respect to the system optical axis OA on the downstream side of the optical path after the second reflecting surface 30b, and the illumination light originated from the illumination light IL2 is inclined slightly to the right on the paper plane with respect to the system optical axis OA and enters the liquid crystal light valve 61g in the direction of the incident light SL2 shown in FIG. 2 as the principal direction of the luminous flux. The incident light SL3 which is obtained by averaging the direction of the luminous flux when using the both first and second light source lamp units 10 and 20 proceeds substantially vertically to an incident surface of the liquid crystal light valve 61g and substantially in parallel with the system optical axis OA.

In the liquid crystal light valve 61g shown in FIG. 2, the incident-light polarization filter 63g selectively allows the linear polarized light in a first polarizing direction to pass through and guides the same to the liquid crystal panel 62g. Here, the first polarizing direction means z-axis directions, which are the left and right directions on the paper plane, vertical to the system optical axis OA. The liquid crystal panel 62g converts the linear polarized light in the first polarizing direction entering thereto into the linear polarized light in a second polarizing direction partly, for example, according to an image signal. Here, the second polarizing direction means y-axis directions vertical to the system optical axis OA and vertical also to the first polarizing direction. The outgoing-light polarization filter 64g selectively allows only the linear polarized light in the second polarizing direction modulated via the liquid crystal panel 62g to pass therethrough.

The liquid crystal panel 62g includes rectangular liquid crystal device 82a, an incident-side dust-proof panel 82d of a flat panel shape to be adhered to a light-incident surface of the liquid crystal device 82a, and an outgoing-side dust-proof panel 82e of a flat panel shape to be adhered to a light-outgoing surface of the liquid crystal device 82a. The liquid crystal device 82a of a main body includes a first substrate 72 on the incident side, and a second substrate 73 on the outgoing side with the intermediary of a liquid crystal layer 71 made up of liquid crystal operated for example in a twisted nematic mode or a vertical alignment mode. The first and second substrates 72 and 73 are both formed into a flat panel shape, and are arranged so that a line normal to light-incident and -outgoing surfaces extends in parallel (in the case of G) to the system optical axis OA, that is, to the x-axis.

The incident-light polarization filter 63g arranged on the upstream side of the optical path of the liquid crystal panel 62g is arranged so that a line normal to light-incident and -outgoing surfaces extends in parallel (in the case of G) to the system optical axis OA (x-axis). The incident-light polarization filter 63g allows only a P-polarized light in the first polarizing direction along the z-axis directions to pass therethrough. In other words, an axis of polarization of the incident-light polarization filter 63g extends in the z-axis directions.

In contrast, the outgoing-light polarization filter 64g arranged on the outgoing side is arranged so that a line normal to light-incident and -outgoing surfaces extends in parallel (in the case of G) to the system optical axis OA (x-axis). The outgoing-light polarization filter 64g allows only the S-polarized light in the second polarizing direction along the y-axis directions to pass therethrough. In other words, an axis of polarization of the outgoing-light polarization filter 64g extends in the y-axis directions.

As is clear from the description given above, the incident-light polarization filter 63g and the outgoing-light polarization filter 64g are arranged so as to constitute a crossed Nicol. The liquid crystal device 82a interposed between the pair of polarization filters 63g and 64g partly restrains a change of the incident lights SL1, SL2, and SL3 entering, for example, from the side of the incident-light polarization filter 63g from the P-polarized light to the S-polarized light on the pixel-to-pixel basis according to an input signal, and emits the modulated light in which rotary polarization from the P-polarized light to the S-polarized light is maintained to the side of the outgoing-light polarization filter 64g as the outgoing light LO.

In the liquid crystal device 82a, a transparent common electrode 75 is provided on a surface of the first substrate 72 on the side of the liquid crystal layer 71 and, for example, an alignment film 76 is provided thereon. In contrast, a plurality of transparent pixel electrodes 77 as display electrodes arranged in a matrix pattern, wiring (not shown) which is capable of electrically connecting to the respective transparent pixel electrodes 77, and a thin-film transistor (not shown) interposed between the transparent pixel electrodes 77 and the wiring are formed on a surface of the second substrate 73 on the side of the liquid crystal layer 71, and for example, an alignment film 78 is formed thereon. Each of respective pixel portions PP which constitute the liquid crystal device 82a includes one of the transparent pixel electrodes 77, part of the common electrode 75, parts of the both alignment films 76 and 78, and part of the liquid crystal layer 71. Provided between the first substrate 72 and the common electrode 75 is a grid-shaped black matrix 79 which partitions the respective pixel portions PP.

The liquid crystal panel 62g having the structure as described above has the incident angle dependency with respect to the illumination light according to a state of the liquid crystal in the liquid crystal device 82a as the main body. In other words, there arises a difference in characteristics of contrast among the lights entering at various angles depending on the incident angle and the incident azimuth. Therefore, the liquid crystal panel 62g does not show the contrast characteristics of the same degree for the incident light SL1 and the incident light SL2 entering in the directions biased in the first direction and the second direction different from each other, and shows better contrast characteristics for the incident light SL1 than for the incident light SL2. The relation between the incident angles and the incident azimuths of the incident lights SL1 and SL2 and the contrast characteristics according to the incident angle dependency of the liquid crystal layer is determined by whether the state of the liquid crystal in the liquid crystal device 82a is in a twisted nematic type or a vertical alignment type or, furthermore, by the state of alignment of the liquid crystal layer 71 in the respective liquid crystal types. Here, the liquid crystal panel 62g is assumed to be a liquid crystal panel of the twisted nematic type, and the incident angle dependency in the case of the liquid crystal of the twisted nematic type will be described.

Referring now to FIG. 2 and other drawings, a state of the liquid crystal in the liquid crystal panel 62g of the twisted nematic type will be described. FIGS. 3A to 3D diagrammatically show four examples of a state of liquid crystalline compounds which constitute the liquid crystal layer of the twisted nematic type. In the liquid crystal panel 62g shown in FIG. 2, in a case where the liquid crystal layer 71 is made up of the liquid crystal of the twisted nematic type, in a state in an electric field is not formed, the liquid crystalline compounds which constitute the liquid crystal layer 71 are arranged along the direction of alignment in the vicinity of the alignment films 76 and 78, and are arranged in a state of substantially vertical to the system optical axis OA (x-axis) and are twisted as they go in the x-direction by 90° at a portion apart from the alignment films 76 and 78. In contrast, in a state in which an adequate electric field is present in the direction along the x-axis, the liquid crystalline compounds which constitute the liquid crystal layer 71 are arranged in a state substantially parallel to the system optical axis OA (x-axis). Accordingly, the liquid crystal layer 71 interposed between the pair of polarization filters 63g and 64g is operated in a normally white mode, so that a maximum light-shielding state (light OFF state) is secured in an ON state in which a voltage is applied thereto. In other words, the liquid crystal panel 62g switches the P-polarized light to the S-polarized light to allow the same to pass therethrough at the time of a white display in a light ON state without the voltage being applied thereto. The liquid crystal panel 62g also allows the P-polarized light to pass therethrough without change at the time of a black display in the light OFF state with the voltage being applied thereto.

The black display in the light OFF state is achieved in the ON state with the voltage applied thereto, but the contrast is lowered if the light-shielding at this time is not sufficient. For example, liquid crystalline compounds LCm from among the liquid crystalline compounds LCt, LCb, LCm, and so on in the liquid crystal layer at the time of the black display shown in FIG. 3A, which are in an intermediate layer apart from the first and second substrates 72 and 73, are not oriented completely vertical to the alignment films 76 and 78 formed on the first and second substrates 72 and 73 of the liquid crystal panel 62g and a tilt (inclination) is still remained. Also, the liquid crystalline compounds LCt and LCb in the vicinity of the alignment films 76 and 78 which interpose the liquid crystal layer 71 therebetween are substantially parallel to the alignment films 76 and 78, respectively, and are in a state slightly inclined. In this manner, in the liquid crystal layer 71 in the actual state, an ideal state of alignment parallel to the electric field is not achieved, and the state in which the tilt is still remained (hereinafter, referred to as a residual tilt) occurs. Because of such the residual tilt, the liquid crystal panel 62g shows the contrast characteristics depending on the incident angle and the incident azimuth of the light. The tilt amounts of the respective liquid crystalline compounds LCt, LCb, LCm, and so on are different from each other, and a direction obtained by integrating the tilt amounts (the degrees of inclination) of the respective portions in the direction of the depth of the liquid crystal layer 71 (x direction) and averaging the same is considered as a direction of alignment of the residual tilt. An azimuth of inclination of the direction of alignment of the residual tilt with respect to the system optical axis OA substantially matches an azimuth of inclination of a direction of alignment of the liquid crystalline compounds LCm in the intermediate layer with respect to the system optical axis OA. Therefore, in the description given below, the azimuth of inclination of the liquid crystalline compounds LCm in the intermediate layer is handled as a representative of the azimuth of inclination of the residual tilt.

Figure 3A:
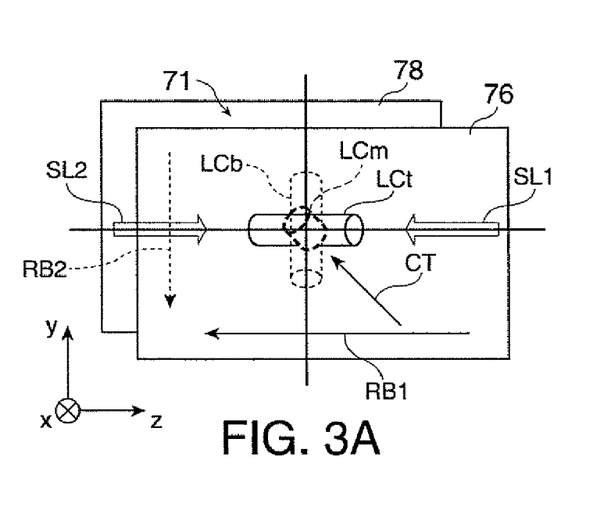
FIGS. 3A to 3D are diagrammatic drawings for explaining states of liquid crystal of a twisted nematic type at the time of a black display.

The direction of alignment of the residual tilt will be considered in detail. First of all, in the case of the liquid crystal of the twisted nematic type, a twisted state of the liquid crystalline compounds is determined by rubbing directions of the alignment films 76 and 78, and the above-described direction of alignment of the residual tilt is determined according to the twisted state. More specifically, for example, in the case shown in FIG. 3A, the rubbing is performed in a direction indicated by a solid arrow RB1, that is, in a −z direction on the alignment film 76, and the rubbing is performed in a direction indicated by a dot line arrow RB2, that is, a −y direction on the alignment film 78. In this case, the liquid crystalline compounds LCt in the vicinity of the alignment film 76 are aligned substantially along the z direction, which is the rubbing direction, and are inclined so as to be shifted slightly toward the alignment film 76 side, that is, in a −x direction on a +z side, which is the opposite side from the rubbing direction. In contrast, the liquid crystalline compounds LCb in the vicinity of the alignment film 78 are aligned substantially along a y direction, which is the rubbing direction, and are inclined so as to be shifted slightly toward the alignment film 78 side, that is, in a +x direction on a +y side, which is the opposite side from the rubbing direction. Therefore, at the time of the black display, the liquid crystalline compounds LCm positioned in the midsection of the liquid crystal layer 71 assume a slightly inclined state from the state substantially parallel to the x-axis according to the tilt of the liquid crystalline compounds LCt and LCb positioned at both ends of the liquid crystal layer 71. The liquid crystalline compounds LCm shown in FIG. 3A are inclined in a +y direction and the −z direction with respect to the positive direction of the x-axis. Therefore, in this case, a direction corresponding to the direction of alignment of the residual tilt at the time of the black display (the direction of alignment represented by the liquid crystalline compounds LCm) is a direction of distinct vision which achieves the most desirable contrast. Here, the azimuth of inclination of the LCm in a plane parallel to a yz plane indicated by an arrow CT shown in FIG. 3A is defined as the direction of distinct vision considering that the directions of inclination of the incident lights SL1 and SL2 shown also in FIG. 2 are reference directions. As regards the arrow CT, which is the direction of distinct vision, an angle formed between the incident light SL1 and the arrow CT is smaller than an angle formed between the incident light SL2 and the arrow CT. In other words, it is considered that the incident light SL1 includes more components in the direction of distinct vision indicated by the arrow CT. Therefore, by using the first light source lamp unit 10 having the direction of the incident light SL1 as its center direction, formation of the image with higher quality is achieved.

Figure 3B:
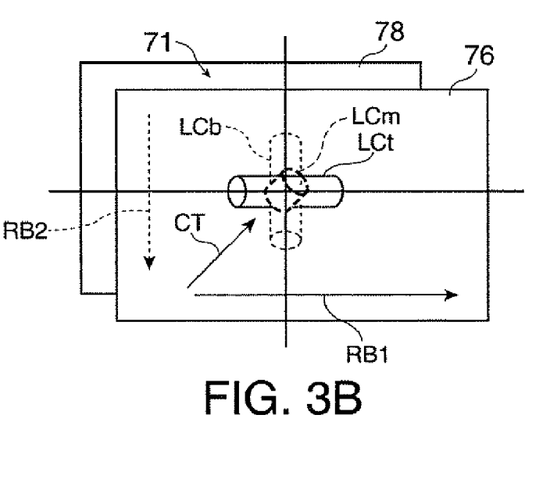
Figure 3C:
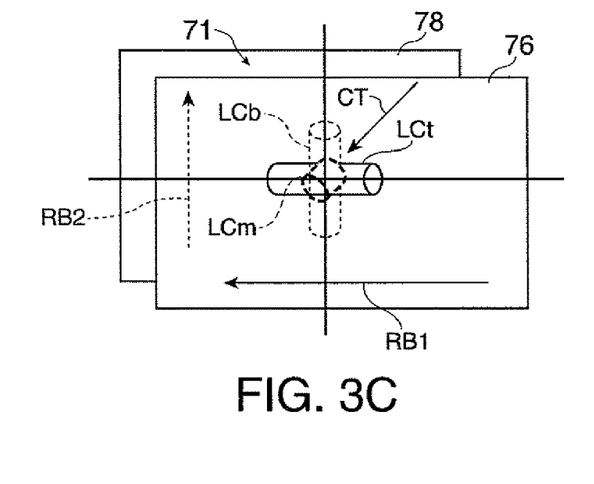
Figure 3D:
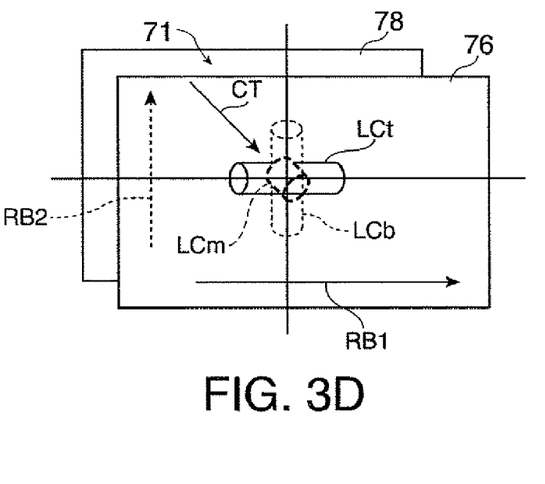

The state of the residual tilt in the liquid crystal layer of the twisted nematic type varies variously depending on the rubbing direction as shown in FIGS. 3B to 3D in addition to the case of FIG. 3A. For example, in FIG. 3B, the arrow RB1 which indicates the direction of the rubbing on the alignment film 76 on the incident side is different from that shown in FIG. 3A. In this case, the direction of distinct vision indicated by the arrow CT is opposite from the case shown in FIG. 3A in terms of the z direction. As shown in FIGS. 3C and 3D, if the direction of the rubbing (the arrow RB2) on the alignment film 78 on the outgoing side is changed, the directions of distinct vision indicated by the arrows CT are opposite from the cases shown in FIGS. 3A and 3B in terms of the y direction. In any cases, by selecting the light including components in the incident direction having higher contrast out of the incident lights SL1 and SL2, formation of the image with higher quality is achieved. In the projector 100 in this embodiment, the liquid crystal panel 62g is of a type shown in FIG. 3A or 3C.

4. Control Device of Projector

Referring now to FIG. 1, the control device 90 as a control system of the projector 100 will be described. The control device 90 includes an image processing unit 91, a panel drive unit 92, a storage unit 93, a light source drive unit 94, and a main control unit 95, and controls the entire projector 100. The image processing unit 91 receives external image signals such as video signals from the outside, and performs processes such as generation and correction of the image signals for driving the respective liquid crystal light valves 61r, 61g, and 61b. The panel drive unit 92 drives the respective liquid crystal light valves 61r, 61g, and 61b on the basis of an output of the image processing unit 91. The storage unit 93 holds a program or the like and stores various signals such as operating signals as instruction commands from users or the like temporarily. The light source drive unit 94 operates the respective first and second light source lamp units 10 and 20 on the basis of the operating signal. The main control unit 95 is in charge of control of the entire projector 100 by operating respective mechanisms in the control device 90. A ROM 93a of the storage unit 93 stores programs stored in advance such as a lighting mode or the like of the lamp and data or the like which specifies the first light source lamp unit 10 turned ON in the contrast-priority mode, and a RAM 93b stores the supplied operating signals or the like temporarily and stores the cumulative lighting time of the respective first and second light source lamp units 10 and 20, for example therein. The main control unit 95 is made up of a microcomputer, and is operated on the basis of programs prepared as needed in the ROM 93a for controlling the image processing unit 91, the light source drive unit 94, and the like. In particular, the projector 100 is able to provide the illumination using any one of the first and second light source lamp units 10 and 20 instead of the illumination using the both first and second light source lamp units 10 and 20, and is configured to be able to select one of different illuminating methods (illumination modes). In other words, the control device 90 functions as an illumination control device configured to control an illuminating action by determining the order of priority of the lighting of the respective first and second light source lamp units 10 and 20.

5. Illumination Control of Projector

Illumination control of the projector 100 by the control device 90 will be described below. The irradiated object of the illumination light is focused on the liquid crystal light valve 61g which affects most the contrast from among the three liquid crystal light valves 61r, 61g, and 61b as a reference, and the liquid crystal light valve 61g is assumed to show a better modulation contrast with the light from the first light source lamp unit 10 than with the light from the second light source lamp unit 20, as described above. In other words, in a one-lamp mode (one-lamp lighting mode) in which only one of the first and second light source lamp units 10 and 20 is turned ON and the other one is turned OFF, the modulation contrast is maintained at a high level by turning the first light source lamp unit 10 ON.

Figure 4A:
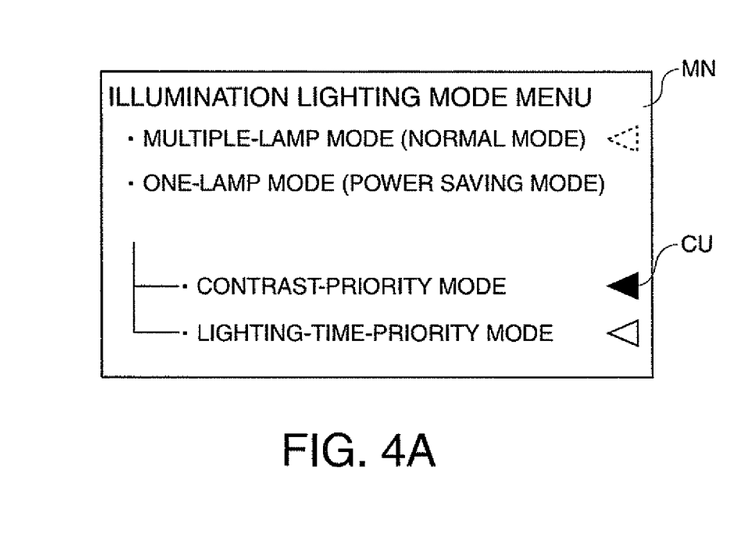
FIG. 4A is an explanatory drawing showing an example of illumination control of the projector.

The projector 100 displays a menu window MN for selecting the lighting mode of the illumination exemplified in FIG. 4A on an operating panel screen (not shown) formed on a surface of a housing of the projector 100 or displays as a projected image for selecting the mode of the illumination. The user of the projector 100 is able to select the mode of the illumination to be performed. Here, the mode of the illumination may be selected between the illumination in a multiple-lamp mode (normal mode) in which both of the first and second light source lamp units 10 and 20 are used, and the illumination in the one-lamp mode (power saving mode) in which either one of these lamp units is used. Furthermore, in the one-lamp mode, the mode of the illumination may be selected between a mode in which a priority is given to the contrast of the projected image and a mode in which a priority is given to one of the first and second light source lamp units 10 and 20 whose cumulative lighting time is shorter in order to elongate the lifetime of the lamps. In other words, the user of the projector 100 is able to select one of the three modes; the multiple-lamp mode, the contrast-priority mode, and the lighting-time-priority mode as the lighting mode of the illumination by operating a cursor CU on the menu window MN by an operating button or the like (not shown) as needed. For example, when the contrast-priority mode is selected from among these modes, a lighting action only by the first light source lamp unit 10, which enables the image projection in the state in which the contrast characteristics are superior, out of the both first and second light source lamp units 10 and 20 is performed.

Figure 4B:
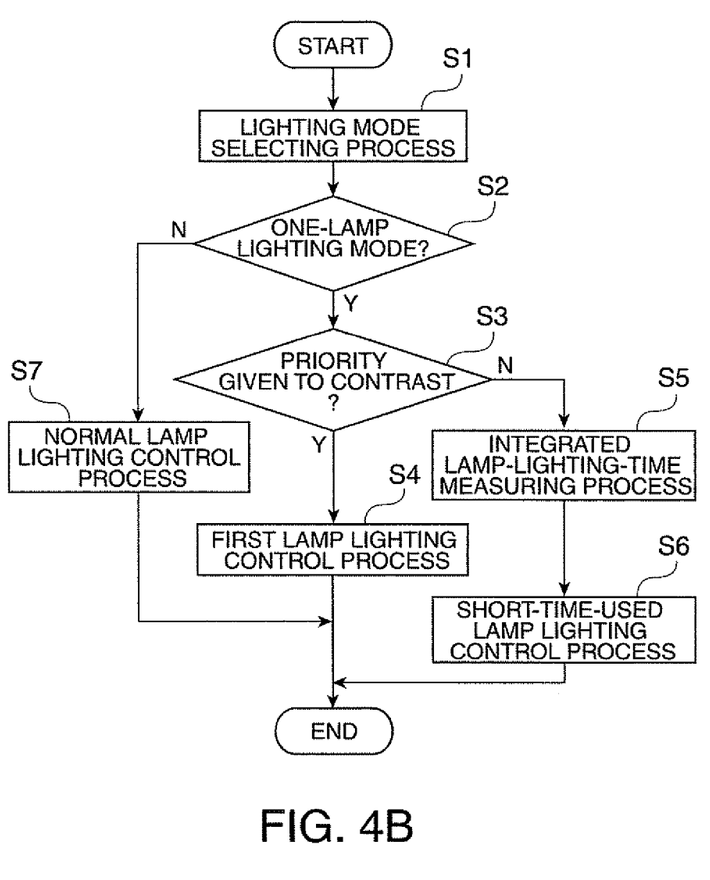

FIG. 4B is a flowchart for explaining an action of the light-source control by the control device 90 according to the selection of the lighting modes of the illumination as described above. First of all, in the main control unit 95 of the control device 90, a lighting mode selecting process for confirming whether there is an input of a signal indicating the selection of the lighting mode of the illumination or not as the operating signal from the user is performed (Step S1). When the input of the signal is confirmed in Step S1, the main control unit 95 determines the type of the lighting mode (Steps S2 and S3). Specifically, whether the selected lighting mode is the multiple-lamp mode (normal mode) or the one-lamp mode (power saving mode) is determined (Step S2) and, when it is the one-lamp mode (Yes in Step S2), whether the selected lighting mode is the contrast-priority mode or the lighting-time-priority mode is determined (Step S3). In this case, the main control unit 95 stores the operating signal in the RAM 93b of the storage unit 93 temporarily, and reads out a program corresponding to the operating signal from the ROM 93a. When it is determined that the contrast-priority mode is selected in Step S3 (Yes in Step S3), the main control unit 95 reads out data on the lamp from the ROM 93a, and performs the lighting action only by the first light source lamp unit 10 which is to be used as a lamp in the contrast-priority mode according to the program (Step S4).

In contrast, when it is determined that the lighting-time-priority mode is selected in Step S3 (No in Step S3), the main control unit 95 reads out the lighting times of the respective first and second light source lamp units 10 and 20 accumulated in the RAM 93b of the storage unit 93 and determines which lamp is to be turned ON, that is, the lamp whose accumulated operating time is short (Step S5). The main control unit 95 performs the lighting action only by the lamp which is determined to have been used only for a shorter time in Step S5 from between the first and second light source lamp units 10 and 20 (Step S6). When it is determined to be the multiple-lamp mode (normal mode) in Step S2 (No in Step S2), the lighting action by the both first and second light source lamp units 10 and 20 is performed without selecting the lamp (Step S7).

Figure 5:
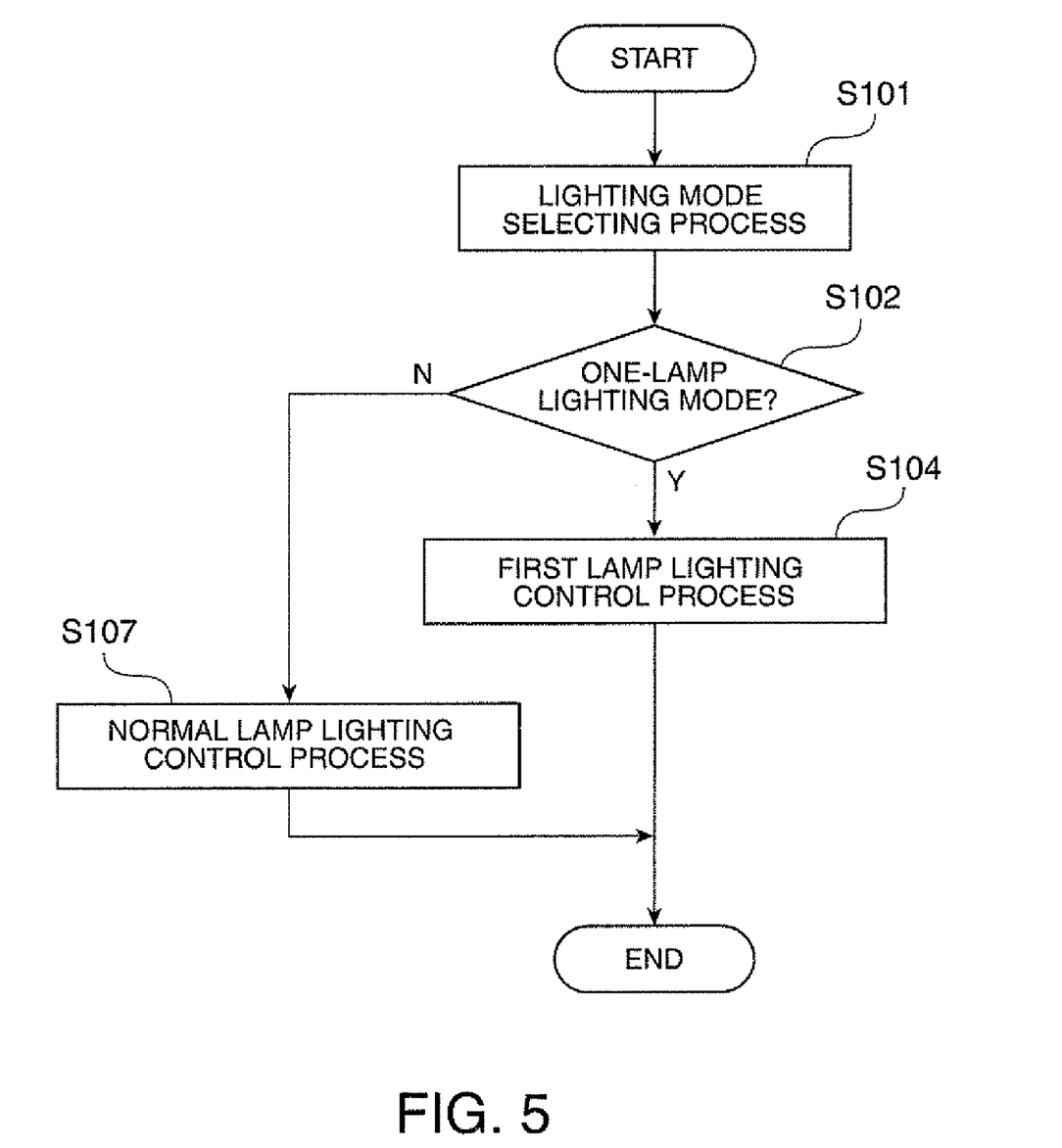
FIG. 5 is a flowchart explaining a modification of the illumination control.

In the example shown in FIGS. 4A and 4B, the mode is selectable from between the contrast-priority mode and the lighting-time-priority mode in the one-lamp mode. However, it is also possible to configure in such a manner that the lighting action is always performed in the contrast-priority mode in the one-lamp mode. In other words, a configuration such that when the lighting mode selecting process is performed (Step S101), the main control unit 95 determines whether the selected lighting mode is the multiple-lamp mode or the one-lamp mode (Step S102) and, when it is determined that the one-lamp mode is selected (Yes in Step S102), the lighting action only by the first light source lamp unit 10 which gives a priority to the contrast is performed (Step S104) as shown in a flowchart in FIG. 5 is also applicable. When it is determined that the multiple-lamp mode is selected in Step S102 (No in Step S102), the lighting action by the both first and second light source lamp units 10 and 20 is performed (Step S107). In the illumination control as described above, maintenance of the contrast characteristics in the one-lamp mode is achieved.

As described above, with the control device 90, the projector 100 according to the first embodiment is able not only to project a light image using the both first and second light source lamp units 10 and 20, but also to perform the illumination control in which only one of the two first and second light source lamp units 10 and 20 is turned ON and the other one is turned OFF for projection. In particular, the projector 100 according to the first embodiment is able to perform the illumination of the light modulation unit while turning ON the first light source lamp unit 10 providing a high contrast property for the liquid crystal light valve 61g which affects most the contrast on a priority basis even when turning only one of the two lamps ON. Accordingly, maintenance of the satisfactory modulation contrast is achieved.

Second Embodiment

Referring now to FIG. 2 and other drawings, a projector according to a second embodiment of the invention will be described. The projector according to the second embodiment is a modification of the projector 100 in FIG. 1, and is the same as the projector 100 other than the internal structure of the liquid crystal panel. Therefore, illustration and description of the configurations other than the structure of the liquid crystal panel will be omitted.

The liquid crystal panel 62g of the projector 100 in the second embodiment is a liquid crystal panel of the vertical alignment type. In other words, configurations in appearance of the liquid crystal panel 62g of the projector 100 are common with the one shown in FIG. 2, while the type of the liquid crystal to be used, and the operating mode are different from the liquid crystal of the twisted nematic type shown as an example in FIG. 2. More specifically, in FIG. 2 for example, the liquid crystal device 82a interposed between the pair of polarization filters 63g and 64g changes the incident lights SL1, SL2, and SL3 entering from the side of the incident-light polarization filter 63g partly from the P-polarized light to the S-polarized light on the pixel-to-pixel basis according to the input signal, and emits the S-polarized light, that is, the modulated light after the change to the side of the outgoing-light polarization filter 64g as the outgoing light LO.

Referring now to FIG. 2 and other drawings, the structure of the liquid crystal of the vertical alignment type and the incident angle dependency of the liquid crystal of the vertical alignment type will be described. FIGS. 6A to 6D diagrammatically show different four examples of the state of the liquid crystalline compounds which constitute the liquid crystal layer of the vertical alignment type. In the liquid crystal device 82a shown in FIG. 2, when the liquid crystal layer 71 is made up of the liquid crystal of the vertical alignment type, in a state in which an electric field is not present, the liquid crystalline compounds which constitute the liquid crystal layer 71 are arranged in a state substantially parallel to the system optical axis OA (x-axis). In contrast, in a state in which an adequate electric field is formed in the direction along the x-axis, the liquid crystalline compounds which constitute the liquid crystal layer 71 are inclined toward a predetermined azimuth, for example, in an xy plane from the state substantially parallel to the system optical axis OA (x-axis). Accordingly, the liquid crystal layer 71 interposed between the pair of polarization filters 63g and 64g is operated in a normally black mode, so that the maximum light-shielding state (light OFF state) is secured in an OFF state of not being applied with the voltage. In other words, the liquid crystal panel 62g also allows the P-polarized light to pass therethrough without change at the time of the black display in the light OFF state. The liquid crystal panel 62g switches the P-polarized light to the S-polarized light to allow the same to pass therethrough at the time of the white display in the light ON state.

Figure 6A:
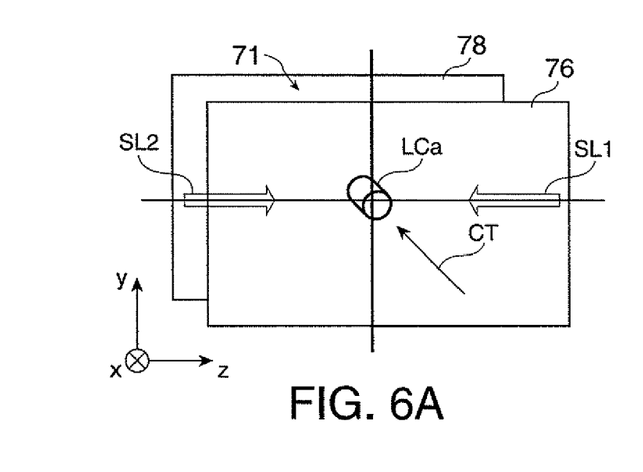
FIGS. 6A to 6D are diagrammatic drawings for explaining states of liquid crystal of a vertical alignment type at the time of the black display.
Figure 6B:
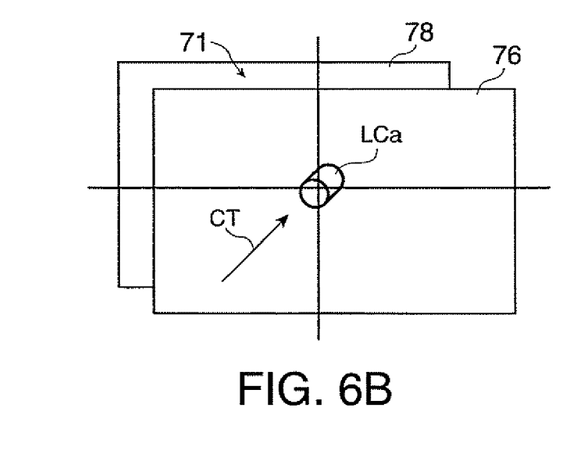
Figure 6C:
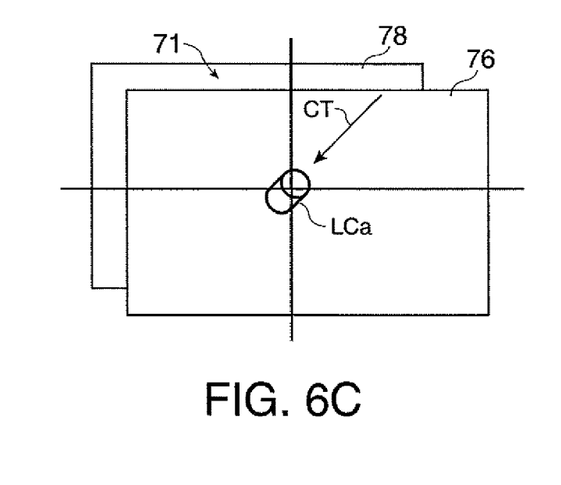
Figure 6D:
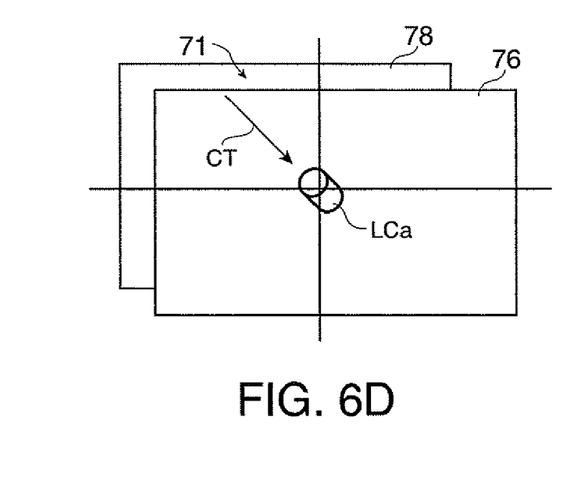

The black display in the light OFF state is achieved when the application of the voltage is in the OFF state and, for example, liquid crystalline compounds LCa in the liquid crystal layer at the time of the black display shown in FIG. 6A are not oriented completely vertical to the alignment films 76 and 78 as part of the substrate of the liquid crystal panel 62g and assume a tilted state (pre-tilt state). For example, in the case of FIG. 6A, the liquid crystalline compounds LCa at the time of the black display are inclined in the +y direction and the −z direction with respect to the positive direction of the x-axis. Therefore, the direction along the liquid crystalline compounds LCa in the pre-tilt state is the direction of distinct vision which achieves the most desirable contrast. Here, the azimuth of inclination of the LCa in a plane parallel to an yz plane indicated by an arrow CT in the same drawing is defined as the direction of distinct vision. It is the same as the cases shown in FIGS. 6B to 6D and the directions indicated by the arrows CT corresponding to the directions along the liquid crystalline compounds LCa in the pre-tile state are the directions of distinct vision which achieve the most desirable contrast. In any cases, by selecting the illumination light including components more in the directions indicated by the arrows CT, formation of the image with higher quality is achieved. In the projector 100 in the second embodiment, the liquid crystal panel 62g is set so that an angle formed between the arrow CT and the incident light SL1 becomes small and is of a type shown in FIG. 6A or 6C.

Third Embodiment

Figure 7:
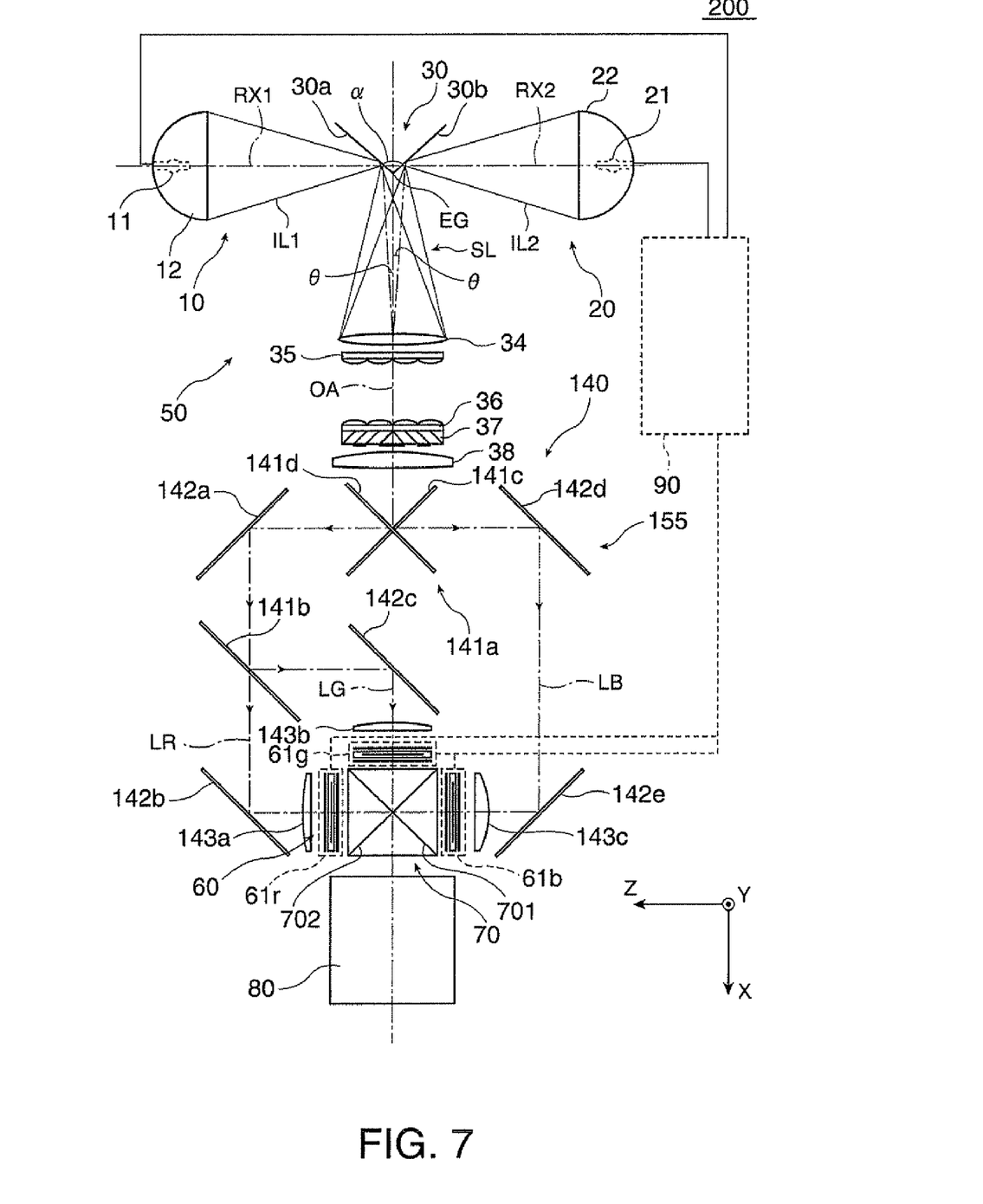
FIG. 7 is a plan view conceptually showing a projector according to a third embodiment.

Referring now to FIG. 7, an action of the projector according to a third embodiment will be described. A projector 200 according to the third embodiment is a modification of the projector 100 shown in FIG. 1, and includes a body optical system 155 and the control device 90 as shown in FIG. 7. The body optical system 155 includes the illumination device 50, a color separation light-guide system 140, the light modulation unit 60, the cross dichroic prism 70, and the projection system 80. The projector 200 has the same structure as the projector 100 other than the structure of the color separation light-guide system 140, and hence the description will be omitted.

The color separation light-guide system 140 includes a cross dichroic mirror 141a, a dichroic mirror 141b, reflection mirrors 142a, 142b, 142c, 142d, and 142e, and three field lenses 143a, 143b, and 143c, and is configured to separate the illumination light emitted from the second light source lamp unit 20 into three colors of red (R), green (G), and blue (B) and guide the respective color lights to the liquid crystal light valves 61r, 61g, and 61b in downstream. More specifically, the cross dichroic mirror 141a includes a first dichroic mirror 141c and a second dichroic mirror 141d in a crossed pattern. The first dichroic mirror 141c reflects the illumination lights LR in R-color and LG in G-color and transmits the illumination light LB in B-color out of the three colors of R, G and B. In contrast, the second dichroic mirror 141d reflects the illumination light LB in B-color and transmits the illumination lights LR in R-color and LG in G-color. The dichroic mirror 141b reflects the illumination light LG in G-color and transmits illumination light LR of the R-color out of two colors of R and G incoming via the reflection mirror 142a. In the color separation light-guide system 140, the illumination light LR transmitted through the dichroic mirror 141b enters the field lens 143a for adjusting the incident angle via the reflection mirror 142b. The illumination light LG reflected from the dichroic mirror 141b enters the field lens 143b for adjusting the incident angle via the reflection mirror 142c. Further, the illumination light LB reflected from the second dichroic mirror 141d enters the field lens 143c for adjusting the incident angle via the reflection mirrors 142d and 142e. In this case, since the optical paths of the respective colors have the same optical path lengths, a relay lens is not necessary.

As described above, in the case of the projector 200, the optical path lengths are equalized among the respective colored lights in the color separation light-guide system 140, and, in addition, the shape of the optical path in the color separation light-guide system 140 is symmetric, so that the number of times of reflection from the mirrors or the like is also equalized. Therefore, the incident angles of the illumination lights LR, LG, and LB entering the respective liquid crystal light valves 61r, 61g, and 61b may be aligned. Specifically, when the liquid crystal layer 71 of the type shown in FIG. 3A or 3C is integrated in the liquid crystal light valve 61g, the liquid crystal layers 71 of the type shown in FIG. 3B or 3D are integrated in the liquid crystal light valves 61r and 61b. Accordingly, in the optical design, desirable modulation contrast is achieved not only in the liquid crystal light valve 61g for example, but also in all of the liquid crystal light valves 61r, 61g, and 61b, which are the light modulation devices for respective colors. In other words, one-to-one correspondence between the incident angles of the illumination lights LR, LG, and LB and the incident angle dependencies of the liquid crystal light valves 61r, 61g, and 61b is achieved so that the light-incident direction from the first light source lamp unit 10 provides a higher contrast to the liquid crystal light valves 61r, 61g, and 61b than the light-incident direction from the second light source lamp unit 20.

The invention is not limited to the embodiments described above, and may be implemented in various modes without departing from the scope of the invention. For example, following modifications are also applicable.

In the first embodiment, the liquid crystal light valve 61g is defined as a reference from among the liquid crystal light valves 61r, 61g, and 61b. However, the invention is not limited thereto, and the liquid crystal light valve 61r or 61b which modulates the colored light other than the green light may be defined as a reference. In the embodiments descried above, the first light source lamp unit 10 is configured to emit the light which provides a higher contrast. However, when the characteristics of the liquid crystal panels to be used are different (for example, when the liquid crystal of the type shown in FIG. 3B or 3D is used), there may be a case where an image with a higher contrast is obtained with the light from the second light source lamp unit 20. In any cases, an adequate selection is achieved by storing data for specifying the lamp in advance in the ROM 93a of the storage unit 93.

Although the combining mirror 30 is made up of the two first and second mirror panels 31 and 32 in the illumination device 50 and the like according to the embodiments shown above, the combining mirror 30 may be made up of a prism if problems such as heat generation do not occur. In other words, a prism having reflecting surfaces as the combining mirror 30 may be formed by cutting out a large prism along a plane vertical to each other. Although the angle α formed between the first reflecting surface 30a and the second reflecting surface 30b is described to be approximately 92°, it may be vertical. In this case, the same configuration is achieved, for example, by arranging the optical axes RX1 and RX2 to be inclined with respect to the system optical axis OA instead of being vertical thereto.

Although the inner surfaces of the respective first and second reflectors 12 and 22 are each formed of the rotating oval surface in the illumination device 50 for example, a free curved surface which is obtained by correcting the rotating oval surface may be used as the inner surface of the each of the first and second reflectors 12 and 22.

A light-cut filters for removing IR light or UV light may be provided separately between the respective first and second light source lamp units 10 and 20 and the combining mirror 30.

Also, a high-pressure discharge lamp such as a metal halide lamp may be used instead of the high-pressure mercury lamp as the respective arc tubes 11 and 21 used in the respective first and second light source lamp units 10 and 20, respectively.

Although the example in which the transmissive liquid crystal light valve is used in the projectors 100, 200 has been described in the embodiments described above, the invention may be applied to a projector employing a reflective liquid crystal light valve.

The entire disclosure of Japanese Patent Application No. 2009-032363, filed Feb. 16, 2009 is expressly incorporated by reference herein.

What is claimed is:

1. A projector comprising:
first and second lamps arranged at different positions from each other and each configured to emit a light;
a combining member configured to combine the light from the first and second lamps in a state of being inclined with respect to each other;
a light modulation device arranged on the downstream side of an optical path of the combining member, configured to be able to be illuminated by the light from at least one of the first and second lamps, and configured to provide higher modulation contrast with respect to the light emitted from the first lamp and entering in a state of being inclined in a first direction with respect to a system optical axis than modulation contrast with respect to the light emitted from the second lamp and entering in a state of being inclined in a second direction which is different from the first direction with respect to the system optical axis; and
an illumination control device configured to turn ON the first lamp having the higher contrast with respect to the light modulation device on a priority basis for illumination of the light modulation device in a one-lamp mode in which only one of the first and second lamps is turned ON.

2. The projector according to claim 1, further comprising:
a color separation light-guide system configured to separate the light outgoing from the combining member into colors on the basis of predetermined wavelengths and guide to optical paths in the respective colors; and
a light modulation unit having colored light modulation devices for respective colors on the optical paths of the respective colors and modulating the respective colored lights guided to the optical paths for the respective colors by the light modulation devices for respective colors,
wherein at least one of the colored light modulation devices for respective colors is the light modulation device.

3. The projector according to claim 1, further comprising:
a color separation light-guide system configured to separate the light outgoing from the combining member into colors on the basis of predetermined wavelengths and guide to optical paths in the respective colors; and
a light modulation unit having colored light modulation devices for respective colors on the optical paths of the respective colors and modulating the respective colored lights guided to the optical paths for the respective colors by the light modulation devices for respective colors,
wherein each of the light modulation devices for respective colors is the light modulation device.

4. The projector according to claim 1, further comprising:
a color separation light-guide system configured to separate the light outgoing from the combining member into color lights that are a red light, a green light, and a blue light on the basis of predetermined wavelengths and guide to optical paths in the respective colors; and
a light modulation unit having colored light modulation devices for respective colors on the optical paths of the respective colors and modulating the respective colored lights guided to the optical paths for the respective colors by the light modulation devices for respective colors,
wherein at least in the colored light modulation device configured to modulate the green light is the light modulation device.

5. The projector according to claim 1, wherein the light modulation device includes a liquid crystal panel configured to modulate an incident light, and a pair of polarization filters arranged on an incident side and an outgoing side of the liquid crystal panel and configured to allow passage of a predetermined polarized light therethrough.

6. The projector according to claim 5, wherein the liquid crystal panel includes a liquid crystal layer of a twisted nematic type, and
an angle formed between the first direction and a direction of alignment of a residual tilt in the liquid crystal layer in a black display state in the liquid crystal panel is smaller than an angle formed between the second direction and the direction of alignment of the residual tilt.

7. The projector according to claim 5, wherein the liquid crystal panel includes a liquid crystal layer of a vertical alignment type,
an angle formed between the first direction and a direction of alignment of a pre-tilt in the liquid crystal layer in a black display state in the liquid crystal panel is smaller than an angle formed between the second direction and the direction of alignment of the pre-tilt.

8. A method of controlling lighting of a projector, the projector including: first and second light sources arranged at different positions from each other and each configured to emit a light; a combining member configured to combine the light from the first and second light sources in a state of being inclined with respect to each other; a light modulation device arranged on the downstream side of an optical path of the combining member, configured to be able to be illuminated by the light from at least one of the first and second light sources, and configured to provide modulation contrast with respect to a light emitted from the first light source and entering in a state of being inclined in a first direction with respect to a system optical axis and modulation contrast with respect to a light emitted from the second light source and entering in a state of being inclined in a second direction which is different from the first direction with respect to the system optical axis, these modulation contrasts being different from each other; comprising:
determining whether a lighting mode is a one-lamp lighting mode in which only one of the first and second light sources is turned ON or not,
wherein when it is determined to be the one-lamp lighting mode by the determining, the light source which causes the light to enter the light modulation device in a direction which provides higher contrast is turned ON.

9. A method of controlling lighting of a projector, the projector including: first and second light sources arranged at different positions from each other and each configured to emit a light; a combining member configured to combine the light from the first and second light sources in a state of being inclined with respect to each other; a light modulation device arranged on the downstream side of an optical path of the combining member, configured to be able to be illuminated by the light from at least one of the first and second light sources, and configured to provide modulation contrast with respect to the light emitted from the first light source and entering in a state of being inclined in a first direction with respect to a system optical axis and modulation contrast with respect to the light emitted from the second light source and entering in a state of being inclined in a second direction which is different from the first direction with respect to the system optical axis, these modulation contrasts being different from each other; comprising:
determining whether a lighting mode is a one-lamp lighting mode in which only one of the first and second light sources is turned ON or not, and
further determining whether the mode is a mode giving a priority to the contrast or not when it is determined to be the one-lamp lighting mode by the determining,
wherein when it is determined that the mode is the mode giving a priority to the contrast by the further determining, the light source which causes the light to enter the light modulation device in a direction which provides higher contrast is turned ON.

10. The method of controlling lighting of a projector according to claim 9, wherein when it is determined to be a mode which does not give a priority to the contrast by the further determining, the light source having a shorter cumulative lighting time from between the first and second light sources is turned ON.

* * * * *